April 11, 1939.　　　A. H. GENTER　　　2,154,380
CURRENT COLLECTOR
Filed Dec. 7, 1937
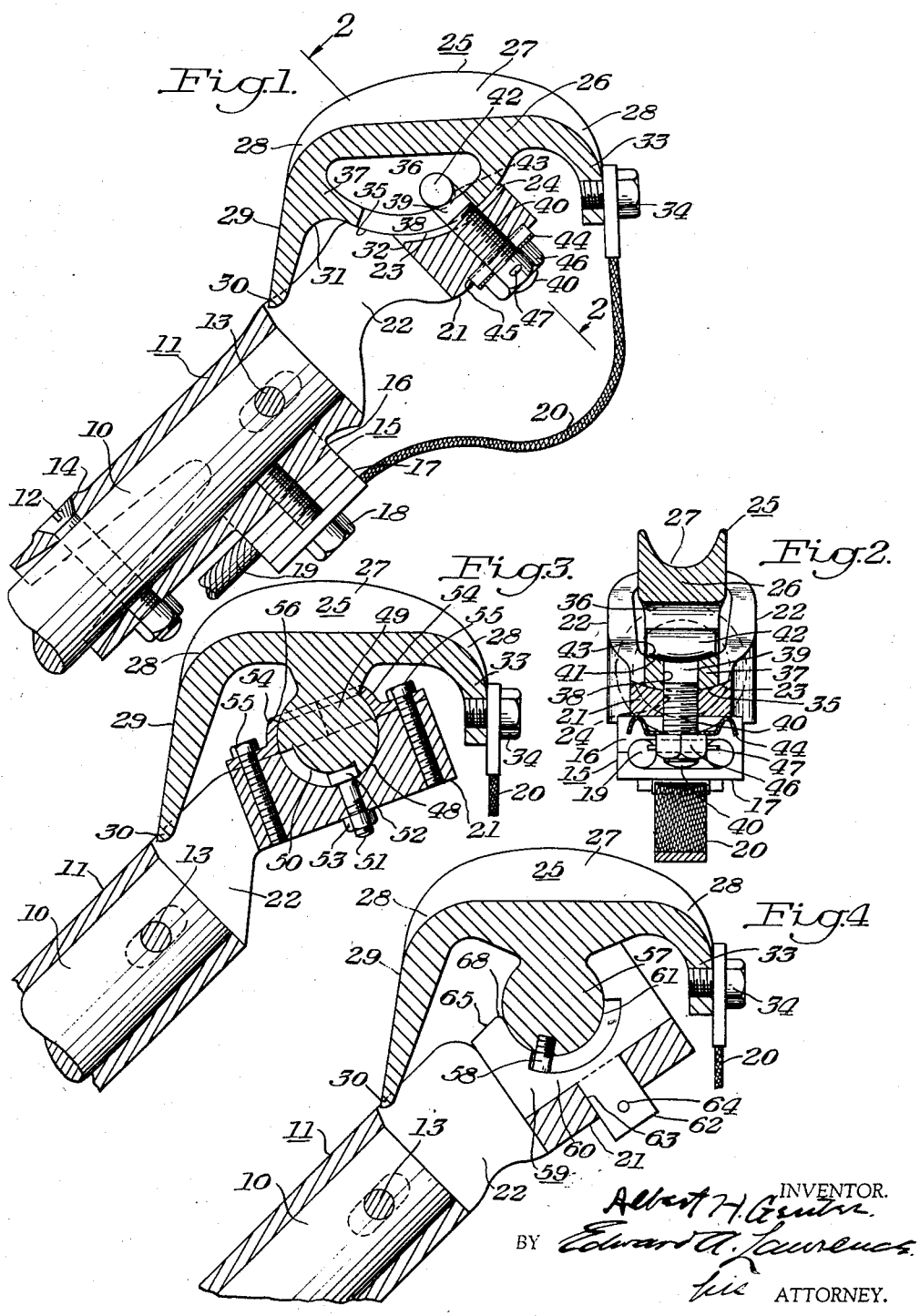
INVENTOR.
Albert H. Genter.
BY Edward A. Lawrence.
ATTORNEY.

Patented Apr. 11, 1939

2,154,380

UNITED STATES PATENT OFFICE 2,154,380

CURRENT COLLECTOR

Albert H. Genter, Ross Township, Allegheny County, Pa., assignor to Duquesne Mine Supply Company, Pittsburgh, Pa., a corporation of Pennsylvania Application December 7, 1937, Serial No. 178,507

4 Claims. (Cl. 191—59.1)

This invention relates generally to electric current collectors and more specifically to shoe type trolley heads arranged to slidably engage a trolley wire.

The principal object of this invention is the provision of a current collecting trolley shoe mounted to have limited movement approximating that obtainable by the use of a universal joint to facilitate its application to various conditions encountered in trolley wire construction.

Another object is the provision of a current collecting trolley head which when accidentally dislodged from the trolley wire is protected from catching a supporting guy wire or other obstruction causing damage to trolley head or the trolley wire net work.

Another object is the provision of a shoe type trolley head having an easily accessible bearing surface which maintains alignment and smooth action even though the bearing surfaces may wear during use.

Other objects and advantages appear hereinafter.

In the accompanying drawing wherein a practical embodiment of the principles of this invention is illustrated, Fig. 1 is a vertical section of a trolley pole head having a shoe mounted thereon.

Fig. 2 is a sectional view taken on the line 2—2 of Fig. 1.

Figs. 3 and 4 are views similar to Fig. 1 illustrating modifications of the mounting of the shoe on the pole head.

Referring to the drawing, 10 represents a trolley pole which may be made of wood, steel or other suitable material and is arranged to be hingedly secured, at its lower end, to a vehicle. The trolley pole head 11 is secured to the upper or free end of the trolley pole by means of the bolts 12 and 13. The top surface of the pole head is provided with the boss 14 which is countersunk to receive the head of the bolt 12 and is filleted to prevent any obstruction from catching the bolt head if the trolley comes off the trolley wire.

The under side of the pole head is provided with a connector block 15 which comprises a base portion 16 integral with the trolley head, a clamping member 17 and a bolt 18 arranged to pass through the clamping member and threadedly engage the pole head. Complementary grooves disposed parallel with the axis of the trolley pole are provided in the base and clamping member on each side of the bolt for receiving the trolley lead wires 19. The outer surface of the clamping member contains a longitudinally disposed slot for receiving one end of the shunt 20 directly under the head of the bolt 18.

21 represents a bearing block preferably made integral with the spaced apart walls or arms 22 which extend from each side of the outer end of the pole head. The walls 22 are spaced sufficiently to provide clearance for the movement of the nose of the trolley shoe therebetween. In some installations it may be desirable to permit the shoe to swing in an arc of approximately 130° in a horizontal plane, whereas in other installations a 90° swing may be sufficient. However the walls 22 may be designed to permit any desired swing of the trolley shoe.

The external surface of the walls 22 from the end of the tubular pole head to the bearing block is streamlined to prevent it from being caught or hooking on any of the wires or arms ordinarily found along the right of way of such installations.

The bearing block 21 shown in Figs. 1 and 2 is substantially rectangular in shape. The upper or bearing surface of the block is spherical, as illustrated at 23 on the drawing. An arcuate slot 24 is disposed longitudinally of the block in the spherical surface 23. This slot may be used to carry heavy greases for lubricating the spherical bearing surface 23 and for receiving particles of foreign material that may alight or collect on the bearing surfaces and are moved to the slot by the movement of the current collecting shoe 25.

The shoe 25 comprises a body portion 26 having a longitudinal groove 27 arranged to receive the trolley wire and be maintained in sliding engagement therewith by a spring forcing the trolley pole upward. The bottom of the groove intermediate the ends of the shoe is preferably flat as shown to provide a generous engagement between the trolley wire and the shoe and to aid the wire in adjusting the shoe on its bearing when the wire changes in elevation, rounds a curve, crosses an intersection and other similar conditions. The ends of the groove 27 are rounded as shown at 28 to produce a smooth engagement of the shoe with the wire under an abrupt change of the trolley wire in an installation.

The front of the shoe is provided with a nose 29 which depends downwardly and forwardly thereof and has converging sides terminating in a tip 30 which remains at all times below the upper edge of the spaced walls 22 on the pole head. This nose carries out the streamline design of the pole head and prevents the shoe from being caught by the trolley wire net work. The forward pitch of the nose 29 may be disposed at any desired angle that will permit a cross supporting wire to slide over the shoe without interference.

The under side of the nose 29 is provided with the web 31 for strengthening the nose and which acts as an abutment to engage the forward end 32 of the bearing block 21 when the trolley pole assumes a substantially horizontal position as when a surface car passes under a low bridge or in the instance of a mine where the ceilings are low.

The rear of the shoe 25 is provided with a tail portion 33 arranged to have bolted thereto the other end of the shunt 20 as illustrated at 34.

The shoe 25 shown in Figs. 1 and 2 is provided with a spherical bearing surface 35 complementary to and arranged to ride on the spherical bearing surface 23 of the bearing block 21. The center of these bearing surfaces is preferably located in the body 26 of the shoe substantially at the center thereof near the trolley wire engaging surface. To make the center of movement at such point it is necessary to provide the extended arcuate bearing surface 35. In order to secure the shoe to the bearing block a transverse hole 36 is formed in the body of the shoe which produces an arcuate bridge 37 extending from the front to the rear of the shoe. The width of this bridge may be extended further than that illustrated on the drawing to provide a longer bearing surface, however, the proportion shown was found to be sufficient. The arcuate bridge 37 is provided with the longitudinal slot 38 for receiving the squared shank portion 39 of the T-headed bolt 40. The head of the bolt 40 may be of any desired shape so long as the bolt may be rotated 90° from that shown in the drawing and inserted or withdrawn through the slot 38.

The inner arcuate surface of the bridge 37 may also be formed in a spherical surface, as illustrated at 41, and the under surface of the head 42 of the T-headed bolt 40 may be spherically shaped, as shown at 43, to form a complementary surface to that of the surface 41. The surfaces 41 and 43 are formed from the same imaginary center as the surfaces 23 and 35 but represent shorter radii than the latter.

Again the surface 41 may be formed cylindrical and the T-shaped bolt head may also have a cylindrical undercut surface, which surfaces may be simpler to make up.

The bolt 40 extends through a clearance hole in the bearing block 21 and a pressure washer 44 is placed thereon and arranged to work in the groove 45 in the bottom of the block 21. The nut 46 which holds the parts in assembled relation may be castellated or provided with a hole to receive a cotter key 47 for locking the nut in position on the bolt when the proper tension is secured on the pressure washer.

Thus the shoe 25 may be rotated in a vertical plane between the limits defined by the ends of the slot 38 or abutments under the nose 29 and the tail 33. The shoe may also be swung in a horizontal plane about the axis of the bolt 40. In actual practice these two movements may be encountered at the same time and the spherical bearing surfaces permit such movement. However it will be noted that the shoe may not be rotated about an axis longitudinally of the groove 27 because of the bolt 40.

Referring now to Fig. 3 the bearing block 21 integral with the spaced apart walls 22 extending from the tubular pole head 11 is provided with a semi-spherical bearing seat 48. The shoe 25 is provided with a depending ball 49 having a spherical surface complementary to that of the seat 48 on which it rides. An arcuate slot 50 is provided in the lower spherical surface of the ball 49 which lies in a vertical plane passing through the axis of the groove 27.

51 represents a bolt arranged to be mounted in the bearing block so that its circular head 52 rests on the shoulder provided therefor and extends into the slot 50 of the ball 49. The bolt may be secured to the bearing by the nut 53. A cylindrical lug or a pin having a press fit may be used in place of the bolt head 52 for preventing the shoe 25 from moving to either side.

The ball of the shoe is held in the socket 48 by means of the spherically dished cap plates 54 which are secured to the top of the bearing block by means of the bolts 55. The circular opening 56 formed by the upper rim of the cap plates acts as an abutment for limiting the oscillation of the shoe 25 in a vertical plane.

Referring to Fig. 4, the shoe 25 is similar to that shown in Fig. 3 in that this shoe is provided with a depending ball 57. The lower end of the ball 57 has a pin 58 inserted therein. This pin may be held within the ball by means of threads or a pressed fit therein.

The bearing arranged to carry the ball 57 comprises a socket member 59 made up in two complementary parts 60 having complementary spherical bearing surfaces. Each part has an arcuate groove 61 which when in assembled relation form a slot for receiving the pin 58. A stem 62, preferably of rectangular cross section, extends from the lower end of each part 60 and when the parts are in assembled relation form a stem having the cross section of a square which is arranged to pass through the square hole 63 in the bearing block 21.

When the complementary bearing parts are assembled around the ball 57, with the pin 58 disposed in the arcuate slot formed by the grooves 61, the stems 62 may be inserted in the hole 63 and held in place by means of the pin, cotter key or other suitable means 64 passing through the end of the stems 62 which extend beyond the lower surface of the bearing block 21.

The circular throat 65 formed by the opening at the top of the bearing parts 60 provides stops or abutments for limiting the oscillating movement of the shoe 25 in a vertical plane.

Thus in each view the trolley shoe 25 is mounted to permit an oscillating movement thereof in a series of vertical planes passing through a single pivotal point. The extent of the oscillating movement may be determined by the abutments and the extent of the swing of the shoe in a horizontal plane may be determined by the design of the spaced apart walls 22. With these mountings a partial universal movement of the shoe is obtained but the lateral rocking movement which is undesirable for use with a trolley shoe of this character is prevented.

I claim:
1. In a current collector, the combination of a trolley pole head, an arm extending rearwardly from each side of said pole head forming an opening therebetween, a bearing block connecting the ends of said arms and having a spherical bearing surface substantially aligned with the axis of the pole head, a trolley wire engaging shoe supported to swivel on the bearing surface of said block permitting movement thereof in a plurality of planes, a substantially straight depending nose on said shoe extending into the opening between said arms, a depending tail on said shoe provided with a shunt connected with the pole head and means for maintaining the tip of said nose between said arms for permitting an obstruction to slide over said shoe.

2. In a current collector, the combination of a trolley pole head, a socket member carried by said pole head, a trolley wire engaging shoe, a ball member on said shoe mating with said socket member to permit said shoe to swivel thereon, an arcuate groove in one of said members, and a pin carried by the other member engaging said groove to prevent relative rocking movement of the shoe transversely to the trolley wire.

3. In a current collector, the combination of a trolley pole head, means defining a non-circular recess in said pole head, a split socket member comprising two complementary parts each having a portion arranged to be held in said recess to maintain said parts in assembled relation, a trolley wire engaging shoe, a ball on said shoe journaled in said socket member and held against disengagement therefrom by the assemblage of the parts of said socket member and means for holding the split socket member in said recess.

4. In a three part current collector the combination of a trolley pole head having a vertically disposed opening formed integrally of two arms connected by a transverse block with a spherical bearing surface and a hole therethrough, a trolley wire-engaging shoe having a depending nose extending into the opening in the pole head and a transverse opening formed by an inverted arcuate bridge integral with said shoe and the bottom surface of which mates with the spherical surface of the bearing block, said bridge provided with a vertically disposed slot, a T-headed bolt, the head of said bolt being arranged to pass up through the slot in the bridge and be turned at right angles, the stem of the bolt extending through the hole in the bearing block and secured with a spring and a nut to permit the shoe to swivel thereon, and means for preventing the nose from raising out of the opening in the pole head.

ALBERT H. GENTER.